United States Patent [19]

Pospischil

[11] Patent Number: 4,807,290

[45] Date of Patent: * Feb. 21, 1989

[54] SELF-SYNCHRONIZING SCRAMBLER

[75] Inventor: Reginhard Pospischil, Gräfelfing, Fed. Rep. of Germany

[73] Assignee: Siemens Aktiengesellschaft, Berlin and Munich, Fed. Rep. of Germany

[ * ] Notice: The portion of the term of this patent subsequent to May 26, 2004 has been disclaimed.

[21] Appl. No.: 784,684

[22] PCT Filed: Feb. 1, 1985

[86] PCT No.: PCT/DE85/00027

§ 371 Date: Sep. 25, 1985

§ 102(e) Date: Sep. 25, 1985

[87] PCT Pub. No.: WO85/03612

PCT Pub. Date: Aug. 15, 1985

[30] Foreign Application Priority Data

Feb. 2, 1984 [DE] Fed. Rep. of Germany ....... 3403650

[51] Int. Cl.[4] ........................... H04K 1/02; H04L 9/04
[52] U.S. Cl. ........................................ 380/43; 380/44; 380/46; 380/47
[58] Field of Search ............... 178/22.14, 22.17, 22.19; 380/33, 36, 37, 42, 43, 44, 48, 49, 50, 46, 47

[56] References Cited

FOREIGN PATENT DOCUMENTS 2410921 6/1979 France .
1591805 6/1981 United Kingdom .

OTHER PUBLICATIONS

"Parallel arbeitende Scrambler, Descrambler und Zufallsfolgen–Generation", Elektronik Arbeitsblatt Nr. 163, pp. 67–70, 12/30/83.

Möhrmann, K. H., "Realisierung von Scramblern für PCM Signale hoher Taktfrequenz", Siemens Forsch—u (see p. 2).

Hermes et al., "Parallel arbeitende Scrambler, Descrambler und Zufallsfolgen—Generatoren", (see p. 2).

Entwickl.-Ber., vol. 6, No. 1, 1977, pp. 1–5.
Elektronik, vol. 32, No. 26, Dec. 1983, pp. 67–70.

Primary Examiner—Stephen C. Buczinski
Assistant Examiner—Bernarr Earl Gregory

[57] ABSTRACT

A self-synchronizing scrambler for high bit rates comprises a plurality of scrambler stages operating in parallel and which respectively represent the series connection of a first modulo-2 adder and a second modulo-2 adder and a shift register stage, whereby the output of the shift register stage is fed back to the input of the first modulo-2 adder of its own scrambler stage and the other input of the first modulo-2 adder is connected to a further scrambler stage.

3 Claims, 3 Drawing Sheets

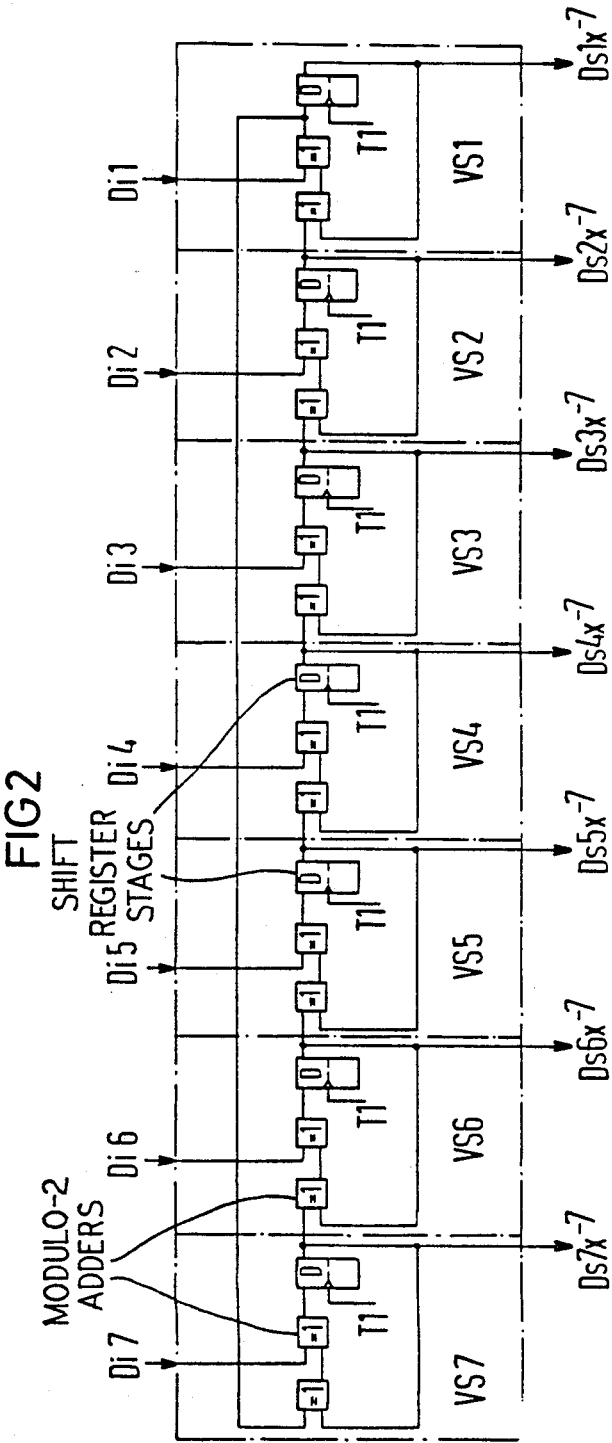

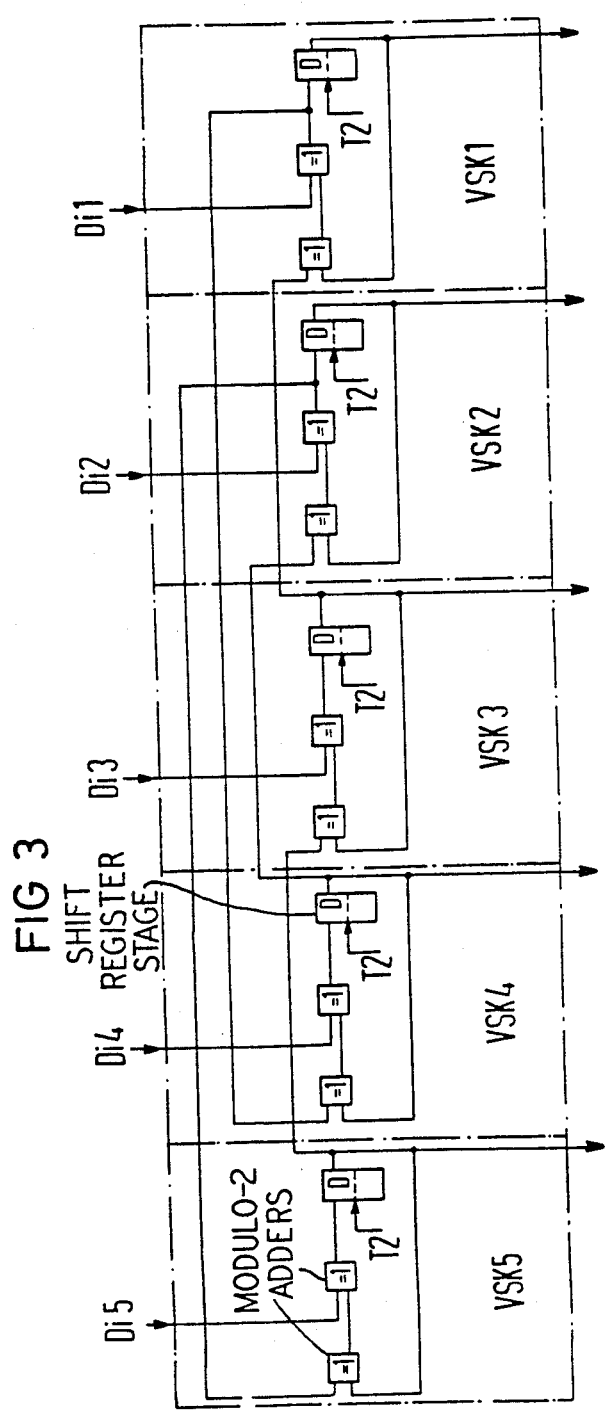

SELF-SYNCHRONIZING SCRAMBLER

CROSS REFERENCE TO RELATED APPLICATION

This application is related to application Ser. No. 784,685 filed Sept. 25, 1985.

BACKGROUND OF THE INVENTION

1. Field of the Invention

The present invention relates to a self-synchronizing scrambler which comprises n clock shift register stages for generating a signal having a scrambler period of $2^n-1$ bits, whereby the output of at least one shift register stage is connected to the input of a modulo-2 adder.

2. Description of the Prior Art

Pulse patterns which have a disturbing DC component or whose energy component is particularly high at certain discrete frequencies can occur in digital signal transmission. In order to avoid these pulse patterns, the digital signal to be transmitted is scrambled at the transmitting side by a modulo-2 addition with a pseudo-random sequence. The descrambling occurs at the receiving side by a further modulo-2 addition with the pseudo-random sequence which was employed at the transmitting side. The synchronization of the pseudo-random generators employed at the transmitting and receiving sides, which is thereby necessary, can be avoided by employing free-wheeling and, therefore, self-synchronizing scrambler and descrambler arrangements.

The expansion of digital telecommunications networks has lead to the installation of transmission devices for signals having very high modulation rates between central points of the network. Resulting therefrom, however, is the necessity of constructing scramblers and descramblers for digital signals having a high clock frequency.

"Siemens Forschungs-und Entwicklungsberichte", Vol. 6, No. 1, 1977, pp. 1-5, fully incorporated herein by this reference, discloses a possibility for constructing scramblers for pulse code modulated (PCM) signals having a high clock frequency. The PCM signals having a high bit sequence are scrambled in a plurality of parallel channels having a lower bit repetition frequency and the signals which arise are combined by multiplexing. The receiving side is constructed in an analogous manner, the parallel descrambling occurring in a plurality of channels following a demultiplexer. In addition to the high expense, the necessity of synchronizing multiplexers and demultiplexers with one another therefore also arises.

SUMMARY OF THE INVENTION

The object of the present invention is to provide a suitable self-synchronizing scrambler for the transmission of digital signals having a high bit repetition frequency which, given relatively low expense, omits multiplexing devices.

In a self-synchronizing scrambler of the type initially set forth, the above object is achieved, according to the present invention in a self-synchronizing scrambler which is characterized in that n parallel inputs for each of n parallel bits of the digital signal to be scrambled are provided; in that the inputs are ordered corresponding to the sequence of the incoming bits with the $n^{th}$ bit at the first input and the following bits at the next inputs and are connected to respective scrambler stages; in that the scrambler stages respectively contain a shift register stage as well as a first modulo-2 adder and a second modulo-2 -adder and the output of the shift register stage is connected to the first input of the first modulo-2 adder and its output is connected to the first input of the second modulo-2 adder; in that the second input of the second modulo-2 adder is connected to the assigned input for the digital signal; and in that the output of the second modulo-2 adder is connected to the input of the shift register stage contained in the same scrambler stage. Furthermore, the invention is characterized in that the second input of the first modulo-2 adder of the one scrambler stage is connected to the output of the shift register stage of the scrambler stage for the $m^{th}$ bit in all scrambler stages up to the $(n-m+1)^{th}$ scrambler stage; in that m is smaller than n and is a whole number; in that, in the $(n-m)^{th}$ scrambler stage, the connection from the second input of the first modulo-2 adder occurs to the input of the shift register stage of the $n^{th}$ scrambler stage and, correspondingly, from the $(n-m-1)^{th}$ scrambler stage to the $(n-1)^{th}$ scrambler stage; in that the individual bits of the scrambled digital signal can be optionally taken at the inputs or at the outputs of the shift register stages; and in that the clock inputs of the shift register stages are connected to a source for a clock signal whose frequency is the 1/7-fold portion of the bit clock frequency of the digital signal.

Particularly advantageous, given the solution provided by the present invention, is the structure of purely digital elements even given longer scramblers, this significantly facilitating integrated construction. Preferred developments of a scrambler constructed in accordance with the invention for generating signals having a scrambler period $2^7-1=127$ bits or of $2^5-1=31$ bits are set forth in greater detail below.

BRIEF DESCRIPTION OF THE DRAWINGS

Other objects, features and advantages of the invention, its organization, construction and operation will be best understood from the following detailed description, taken with the accompanying drawings, on which:

FIG. 2 is a circuit diagram of a seven-stage scrambler; and

FIG. 3 is a circuit diagram of a five-stage scrambler.

DESCRIPTION OF THE PREFERRED EMBODIMENTS

Figure 1:
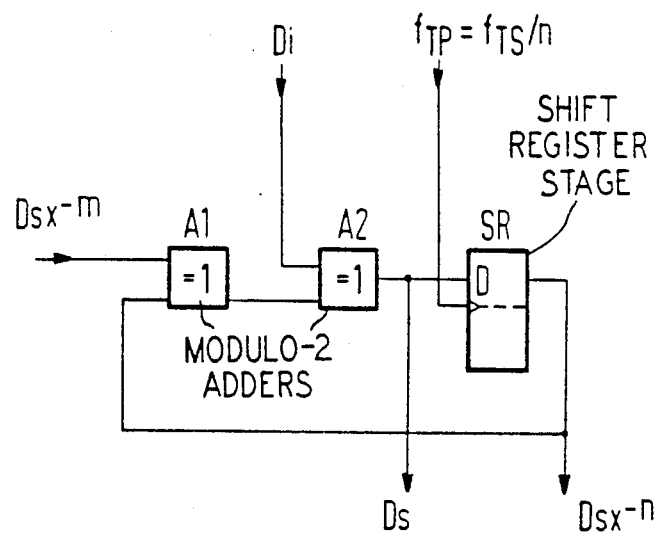
FIG. 1 is a circuit diagram of an individual scrambler stage.

The scrambler stage illustrated in FIG. 1 is a portion of an n-stage scrambler. The scrambler stage comprises a first modulo-2 adder A1 and a second modulo-2 adder A2, as well as a shift register stage SR, and serves for scrambling the $n^{th}$ bit of a digital signal so that the corresponding, scrambled bit $Ds \cdot x^{-n}$ is output at the output of the shift register stage SR. The output of the shift register stage SR is also connected to the first input of the first modulo-2 adder A1, whereas its second input is connected to the output of the shift register stage SR of the scrambler stage which scrambles the $m^{th}$ bit and generates a corresponding output signal $Ds \cdot x^{-m}$. The output of the first modulo-2 adder A1 is connected to the first input of the second modulo-2 adder A2, at whose second input a bit of the digital signal Di to be scrambled is applied. The scrambled digital signal Ds can be taken at the output of the second modulo-2 adder A2. This signal is also available at the output of the shift register stage SR one clock period later. The shift register stage SR is thereby charged with a clock signal F, the so-called shift clock, which derives from the bit clock of the digital signal to be scrambled divided by the number n of bits simultaneously processed in parallel.

A plurality of scrambler stages constructed in accordance with FIG. 1 are interconnected for scrambling digital signals. The inputs Di and the outputs Ds thereby lie in parallel so that a series-to-parallel converter is to be connected preceding the scrambler and a parallel-to-series converter is to be connected following the scrambler for serial transmission. The series-to-parallel conversions for scrambling and descrambling and the corresponding parallel-to-series conversions thereby do not require bit synchroniztion; word synchronization between the scrambler and the descrambler is likewise not required. The number of parallel bit streams is to be optimized in accordance with the respective use. When, for example, a code conversion occurs after scrambling, the code conversion presuming a series-to-parallel conversion, for example a 4B3T or 5B6B code conversion, then four parallel bit streams are to be correspondingly scrambled in the first case and five parallel bit streams are to be correspondingly scrambled in the second case. The converters which are already present then facilitate the use of the parallel scramblers of the invention at the transmitting side and at the receiving side. Due to the parallel scrambling with a fraction of the original bit clock, the processing speed is diminished such that one can usually shift to a more simple and, therefore, less expensive semiconductor technology. For a defined scrambler period, a scrambler operating in parallel requires the same number of shift register stages as the scrambler operating serially; the number of modulo-2 adders required is higher, however, given the parallel scrambler.

FIG. 2 illustrates a self-synchronizing scrambler constructed of seven of the scrambler stages illustrated in FIG. 1. A maximally long bit sequence having a scrambler period of $2^7-1=127$ bits derives due to the chained circuit. Given a shift direction from left to right, the scrambler stages for the bit n, i.e. the seventh bit, for the sixth, ... third, second, first bit follow from left to right. When one considers a stage L having $T<L<n$, then the first stage to the left of the stage L under consideration has the signal $Ds \cdot x^{+1}$ at the digital signal output Ds and has the signal $Ds \cdot x^{1-n}$ at the output of the D flip-flop employed as the shift register stage. Correspondingly, the second stage toward the left has the signals $Ds \cdot x^2$ and, respectively, $Ds \cdot x^{2-n}$. Inversely, the signals $Ds \cdot x^{-1}$ and $Ds \cdot x^{-1-n}$ appear at the corresponding outputs of the first stage to the right of the stage L under consideration. Given the scrambler of FIG. 2, $n=7$ and $m=n-1$ apply.

The input $Ds \cdot x^{-m}$ is connected to an output $Ds \cdot x^{-6}$ that is the respective output of the D flip-flop of the stage preceding at the left, whereby the seventh and last stage is again connected to the first stage. In contrast to FIG. 1, it is not the inputs, but the outputs, of the shift register stages which are employed here as scrambler outputs, so that the output signal appears shifted by one clock period of the scrambler, thereby, however, again traverse the clocked shift register stage and, therefore, being free of pulse peaks. Differing from all other scrambler stages, the second input of the first modulo-2 adder of the seventh scrambler stage VS7 is not connected to the output, but to the input, of the shift register stage of the first scrambler stage VS1. The D flip-flops employed as shift register stages are charged with a clock signal whose frequency is equal to 1/7 of the clock frequency of the digital signals to be scrambled.

FIG. 3 illustrates a 5-stage scrambler in which $n=5$ and $m=n-2=3$. The individual scrambler stages VSK1 ... VSK5 correspond to the scrambler stage illustrated in FIG. 1, whereby the scrambled signal, after traversing the individual shift register stage, is taken at the output of the shift register stage in the same manner as that illustrated in FIG. 2. In order to produce a maximally long pseudo-random sequence, i.e. a maximum scrambler period, $m=3=n-2$ was selected. Accordingly, the second input of the first modulo-2 adder of the individual scrambler stages are connected either to the shift register output of the respective second stage to the left of the scrambler stage or to the input of the shift register stage of the third scrambler stage to the right of the scrambler stage under consideration. Also true here, therefore, is the general rule that the second input of the first modulo-2 adder of the one scrambler stage is connected to the output of the shift register of the scrambler stage for the $m^{th}$ bit in all scrambler stages up to the $(n-m+1)^{th}$ scrambler stage, whereby m is smaller than n and is a whole number. With the $(n-m)^{th}$ scrambler stage, the connection then occurs from the second input of the first modulo-2 adder to the input of the shift register stage of the $m^{th}$ scrambler stage; at the $(n-m-1)^{th}$ scrambler stage, correspondingly, the connection occurs to the shift register stage of the $(n-1)^{th}$ scrambler stage.

The self scrambler does not fall into an undesired short period, the third modulo-2 adder whose free input is connected to a recognition circuit for the short periods can be connected between the first and second modulo-2 adders. A suppression of pulse peaks also occurs here by taking the scrambled signal at the output of the shift register stage. The shift clock signal T2 for the D flip-flops employed as shift register stages is generated by frequency division, whereby the frequency of the shift clock T2 is 1/5 of the bit clock frequency of the digital signals to be scrambled.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A self-synchronizing scrambler comprising n parallel scrambler stages each comprising a first modulo-2 adder and a second modulo-2 adder connected in series and a clock shift register stage, including n parallel inputs for respective ones of n bits arriving in parallel of a digital signal to be scrambled, the inputs being ordered corresponding to the sequence of the incoming bits with the $n^{th}$ bit applied to the first input and the following bits applied in succession to the remaining inputs in each scrambler stage, one input of the second modulo-2 adder representing the signal input and the output of the second modulo-2 adder representing the signal output, characterized in that, for the generation of the scrambled signal having a scrambler period of $2^n-1$ bit, one shift register stage is provided in each scrambler stage and therefore n shift register stages are provided in total; in that the output of the shift register stage (SR) is connected to the first input of the first modulo-2 adder (A1) and its output connected to the first input of the second modulo-2 adder (A2); in that the second input of the second modulo-2 adder (A2) is connected to the assigned input for the digital signal; in that the output of the second modulo-2 adder (A2) is connected to the input of the shift register stage (SR) contained in the same scrambler stage; in that the second input of the first modulo-2 adder (A1) of the one scrambler stage is connected to the output of the shift register stage of the scrambler stage for the $m^{th}$ bit in all scrambler stages up to the $(n-m+1)^{th}$ scrambler stage; in that m is smaller than n and is a whole number; in that, in the $(n-m)^{th}$ scrambler stage the connection from the second input of the first modulo-2 adder is to the input of the shift register stage of the $n^{th}$ scrambler stage and, correspondingly, from the $(n-m-1)^{th}$ scrambler stage to the $(n-1)^{th}$ scrambler stage; in that the individual bits of the scrambled digital signals can be optionally taken at the inputs or at the outputs of the shift register stages; and in that the clock inputs of the shift register stages are connected to a source for a clock signal whose frequency is the 1/7-fold portion of the bit clock frequency of the digital signal.

2. The scrambler of claim 1, wherein n is seven and further comprising:
   a source of serial data signals; and
   a series-to-parallel converter including an input connected to said source and seven outputs each connected to a respective signal input.

3. The scrambler of claim 1, wherein n is five, and further comprising:
   a source of serial data signals; and
   a series-to-parallel converter including an input connected to said source and five outputs each connected to a respective signal input.

* * * * *